United States Patent [19]

Hamlen

[11] Patent Number: 5,560,783
[45] Date of Patent: Oct. 1, 1996

[54] THERMOPHOTOVOLTAIC GENERATOR

[75] Inventor: Robert P. Hamlen, Bernardsville, N.J.

[73] Assignee: The United States of America as represented by the Secretary of the Army, Washington, D.C.

[21] Appl. No.: 344,800

[22] Filed: Nov. 23, 1994

[51] Int. Cl.$^6$ .................... H01L 31/058; H01L 31/055
[52] U.S. Cl. ................................. 136/253; 136/247
[58] Field of Search ......................... 136/247, 253

[56] References Cited

U.S. PATENT DOCUMENTS

| | | | |
|---|---|---|---|
| 3,433,676 | 3/1969 | Stein | 136/253 |
| 3,929,510 | 12/1975 | Kittl | 136/247 |
| 4,149,902 | 4/1979 | Mauer et al. | 136/247 |
| 4,242,147 | 12/1980 | DeToia | 136/253 |
| 4,776,895 | 10/1988 | Goldstein | 136/253 |
| 5,383,976 | 1/1995 | Fraas et al. | 136/253 |

*Primary Examiner*—Aaron Weisstuch
*Attorney, Agent, or Firm*—Michael Zelenka; William H. Anderson

[57] ABSTRACT

A thermophotovoltaic generator for use in generating electricity using a gas or liquid fueled light emitter and an absorber with photocells, is provided. This generator includes a burner and mantle light emitter, and includes a multi-layer absorber having cylindrical layers of peripherally spaced tube units, each unit having end wall photocells which form a chamber that contains a dye.

5 Claims, 2 Drawing Sheets

THERMOPHOTOVOLTAIC GENERATOR

GOVERNMENT INTEREST

The invention described herein may be manufactured, used and licensed by or for the Government of the United States of America without the payment to me of any royalties thereon.

FIELD OF THE INVENTION

The invention described herein generally relates to a thermophotovoltaic generator, and in particular the invention relates to a multi-spectral thermophotovoltaic energy generator having a central, light emitting, burner and mantle subassembly and having a surrounding concentric light absorber subassembly with concentric layers tuned to collect selective portions of the mantle emission spectrum through respective collector tubes with end mounted photocells.

BACKGROUND OF THE INVENTION

A prior art thermophotovoltaic generator includes a central, light emitting, burner and mantle subassembly and includes a surrounding group of photocells which are tuned to the emission spectrum of the mantle.

One problem with the prior art generator is that the generator requires a relatively large number of photocells.

Another problem of the prior art generator is that the generator does not provide a complete utilization, or energy conversion, of the entire spectral energy radiated by the burner and mantle subassembly.

One object of the present invention is to provide a generator wherein the number of photocells is minimized.

Another object of the present invention is to maximize the energy conversion of the entire spectral energy radiated by the burner and mantle subassembly.

SUMMARY OF THE INVENTION

According to the present invention, a thermophotovoltaic generator is provided. This generator includes an inner burner and mantle subassembly having an axis and includes an outer coaxial absorber subassembly having cylindrical layers, each layer having peripherally spaced, abutting tube units, each tube unit having an elongate tubular member and having respective end walls with respective photocells, which enclose a chamber for containing dye, so that each layer can be set to collect only a selective part of the spectrum of the radiated light for transmission to the layer's photocells.

By using cylindrical layers of tube units, which contain dye, and which have opposite end walls with respective photocells, the selective parts of the light spectrum can be more effectively transmitted to its photocells, whereby the number of photocells is minimized and the energy conversion is maximized.

BRIEF DESCRIPTION OF THE DRAWINGS

The foregoing and other objects, features and advantages will be apparent from the following description of the preferred embodiment of the invention as illustrated in the accompanying drawings.

DESCRIPTION OF THE PREFERRED EMBODIMENT

Figure 2:
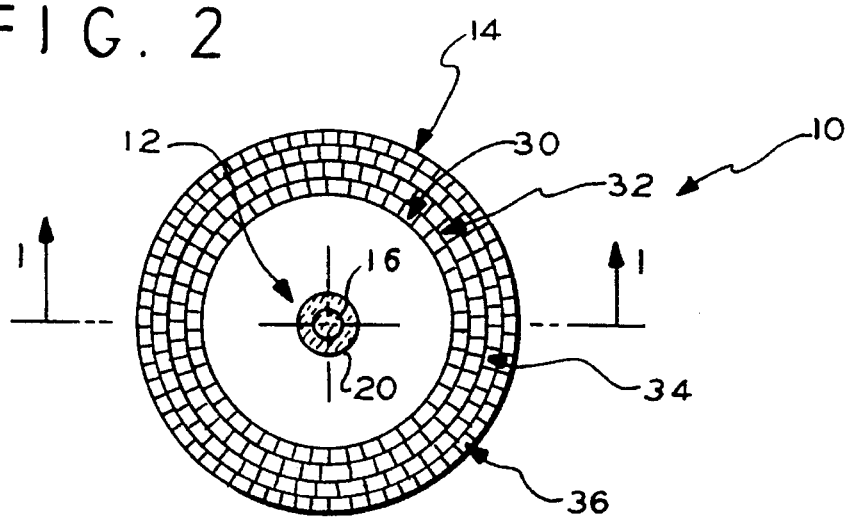
FIG. 2 is a plan view as taken along the line 2—2 of FIG. 1.
Figure 1:
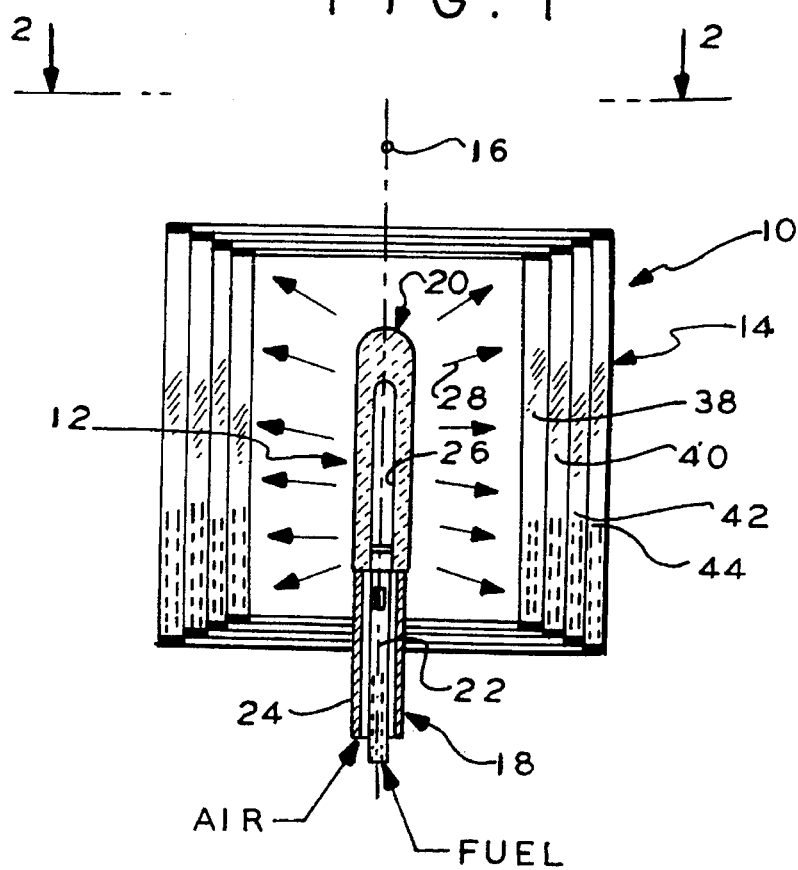
FIG. 1 is a section view of a generator according to the invention.
Figure 4:
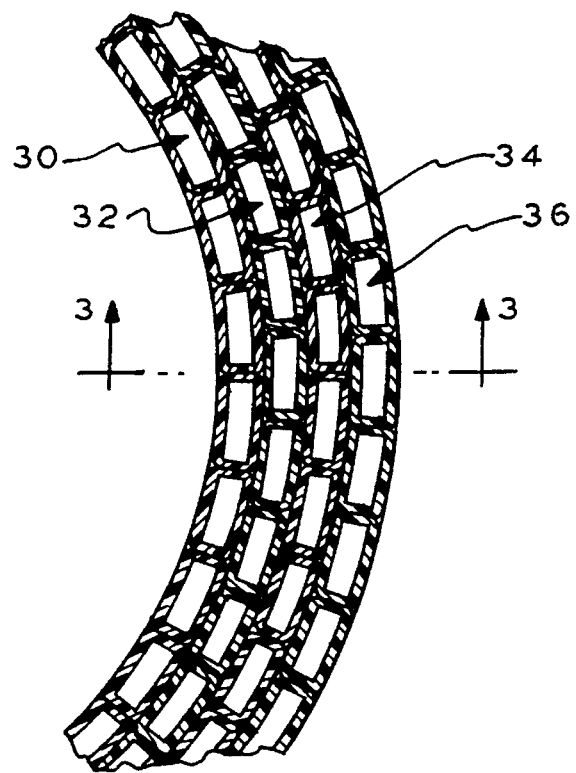
FIG. 4 is a section view as taken along the line 4—4 of FIG. 3.
Figure 3:
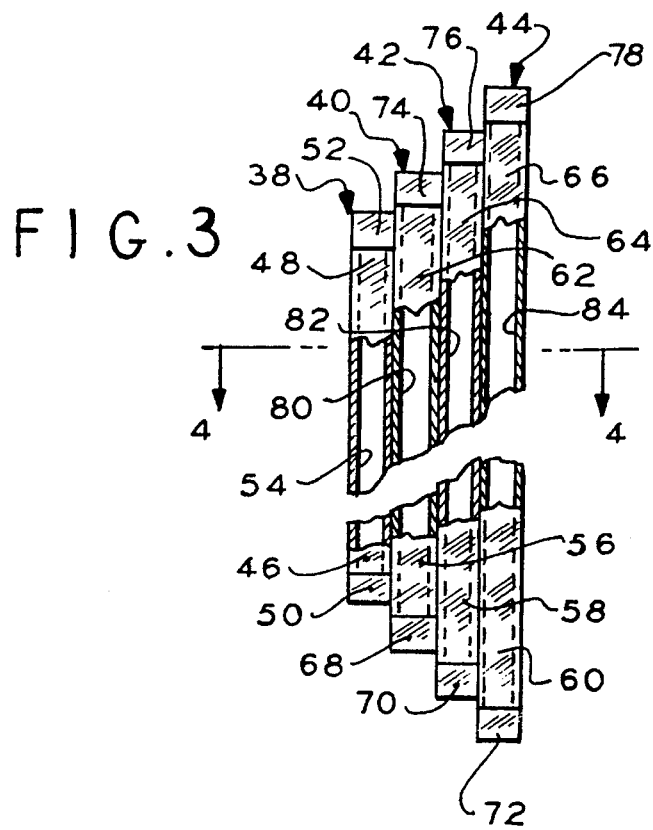
FIG. 3 is an enlarged portion of FIG. 1.

As shown in FIGS. 1 through 4, a device or generator 10 is provided. Generator 10 has a light emitter or burner and mantle subassembly 12. Generator 10 also has a light absorber or outer multi-layer light absorbing subassembly assembly 14. Generator 10, which has an axis 16, generates electricity from a gas fuel. Subassemblies 12 and 14 are coaxial along axis 16.

Inner subassembly 12 has a burner 18 and a mantle 20. Burner 18 has a radially inner fuel tube 22. Burner 18 also has a radially outer air tube 24, which surrounds inner tube 22. Mantle 20 has a flame chamber 26. Mantle 20 also emits a plurality of radiation lines 28 when burner 18 is ignited. Mantle 20 is a hood of refractory material which gives light by incandescence when placed over a flame.

Outer subassembly 14 has two to four luminescent collectors, or shells, or cylinders, or layers 30, 32, 34, 36. Outer subassembly 14 preferably has at least one layer but not more than five layers. Each cylinder or layer 30, 32, 34, 36 is formed by a respective plurality of angularly spaced, hollow, abutting tube units 38, 40, 42, 44. Each tube unit 38, or 40, or 42 or 44 which is sealed at its ends, has an approximately rectangular or square cross-section. Tube units 38, 40, 42, 44 are composed of a glass material, or a plastic material, or the like. Tube units 38, 40, 42, 44 contain a dye which absorbs a different region, or particular segment of the spectrum. For purposes of this specification and the ensuing claims, the term, "dye," means any liquid, gas or solid that is capable of absorbing a predetermined region or Segment of the radiation spectrum. Tube units 38, 40, 42, 44 emit light over 360 degrees. Most of the light is trapped within the layer, as a result of the relationship between the layer thickness and the angle of incidence.

Tube unit 38, which is identical in construction to tube units 40, 42, 44, has a bottom end portion 46 and has a top end portion 48. Bottom end portion 46 has a bottom solar cell 50. Top end wall portion 48 has a top solar cell 52. Cells 50 and 52 form tube end walls, and enclose a chamber 54, which holds the dye for collecting a spectrum section.

Tube units 40, 42, 44 have respective bottom end portions 56, 58, 60 and have respective top end portions 62, 64, 66. Tube units 40, 42, 44 have respective bottom solar cells 68, 70, 72 and have respective top solar cells 74, 76, 78. Tube units, 40, 42, 44 have respective chambers 80, 82, 84, which contain the dye.

Solar cells 50, 52 are tuned to the specific light output of tube unit 38. Solar cells 68, 74 and 70, 76 and 72, 78 are tuned to the respective specific light outputs of tube units 40, 42, 44.

In operation, light emitter 12 radiates light 28 from mantle 20 to light collector or absorber 14. Absorber 14 collects the light. Each layer 30, 32, 34 and 36 collects a selective portion of the light spectrum of the mantle radiation. The light remains in layers 30, 32, 34 and 36; and then the light reaches respective cells 50, 52 and 68, 74 and 70, 76 and 72, 78. The refraction index is graded within layers 30, 32, 34, 36 to facilitate trapping. Mantle 20 is also tuned in order to obtain an optimum response from layers 30, 32, 34, 36 and their photocells. The photocells are arranged in series with segmented lights which are designed for constant current in each layer to allow series connection of the layers.

The advantages of generator 10 are indicated hereafter.

A) Generator 10 minimizes the number of photocells without reducing performance..

B) Generator 10 maximizes energy conversion of the entire spectral energy radiated by the burner and mantle subassembly.

C) Generator 10 increases the intensity of light falling on the photocells, whereby total photocell area and related cost are reduced.

While the invention has been described in its preferred embodiment, it is to be understood that the words which have been used are words of description rather than limitation and that changes may be made within the purview of the appended claims without departing from the true scope and spirit of the invention in its broader aspects.

For example, flat plate collectors can be used instead of cylindrical collectors 30, 32, 34, 36, by placing a flat plate collector on each side of the burner and mantle subassembly 12.

What is claimed is:

1. A thermophotovoltaic generator comprising:

a light emitter having a burner and having a mantle surrounding the burner for providing radiated light;

a light absorber spaced from said light emitter and having at least one layer;

said layer having a plurality of elongate tube units;

each said tube unit having an annular wall and opposite end walls enclosing a chamber for containing a material for collecting a selected portion of the light spectrum of the radiated light for transmission to the end walls;

said end walls having respective photocells for receiving the light and for generating electrical power therefrom.

2. The generator of claim 1, wherein the burner is a fueled burner having an axis; and wherein the layer is a coaxial cylindrical shell-like layer; and wherein the tube units are peripherally spaced, abutting tube units forming the cylindrical shell-like layer.

3. The generator of claim 2, wherein the tube units are axially parallel tube units; and wherein the end walls of each tube unit are axially spaced and enclose the respective chamber for containing the respective collecting material; and wherein each tube unit end wall is a photocell unit which is fixedly connected to the annular wall.

4. The generator of claim 3, wherein the light absorber has a plurality of contacting coaxial layers of substantially identical construction forming a multi-layer cylinder.

5. A generator comprising:

a burner and mantle subassembly for radiating light, said subassembly having an axis;

a multi-layer coaxial absorber for collecting the radiated light;

said absorber having a plurality of contacting coaxial layers;

each layer having a plurality of tube units spaced about the axis;

said tube units being peripherally spaced and in abutting arrangement;

each tube unit having an annular wall and axially spaced end walls enclosing a dye chamber; and each end wall having a photocell for making electricity from the radiated light.

* * * * *